United States Patent [19]

Maxson et al.

[11] Patent Number: 5,491,407
[45] Date of Patent: Feb. 13, 1996

[54] WHEEL BEARING SPEED SENSOR

[75] Inventors: William R. Maxson, Fort Wayne; Jerry D. Heiniger, Anderson; James C. Rustman, Huntington, all of Ind.

[73] Assignee: Kearney-National, Inc., White Plains, N.Y.

[21] Appl. No.: 383,079

[22] Filed: Feb. 3, 1995

[51] Int. Cl.$^6$ ............................ G01P 3/488; F16C 32/00
[52] U.S. Cl. ............... 324/174; 324/207.15; 324/207.22; 384/448
[58] Field of Search ........................... 324/166, 173, 324/174, 207.15, 207.16, 207.22, 207.25; 188/181 R, 181 A; 384/448; 310/154, 155, 166–171

[56] References Cited

U.S. PATENT DOCUMENTS

| | | | |
|---|---|---|---|
| 3,500,091 | 3/1970 | Jones | 324/174 X |
| 3,551,712 | 12/1970 | Jones et al. | 324/174 X |
| 3,739,211 | 6/1973 | Hasler | 310/168 |
| 3,960,248 | 6/1976 | Tribe | 188/181 R |
| 4,027,753 | 6/1977 | Lantz | 324/174 X |
| 4,904,936 | 2/1990 | Richmond . | |
| 4,954,775 | 9/1990 | Richmond | 324/174 |
| 4,968,933 | 11/1990 | Richmond . | |
| 4,970,462 | 11/1990 | Richmond . | |
| 5,023,547 | 6/1991 | Pawlak et al. . | |
| 5,111,098 | 5/1992 | Peck et al. . | |
| 5,140,261 | 8/1992 | Seo et al. . | |
| 5,200,697 | 4/1993 | Adler et al. . | |
| 5,227,719 | 7/1993 | Peterson et al. . | |
| 5,281,911 | 1/1994 | Caron et al. . | |
| 5,291,130 | 3/1994 | Kendzior . | |
| 5,296,805 | 3/1994 | Clark et al. . | |
| 5,332,964 | 7/1994 | Ouchi . | |
| 5,336,995 | 8/1994 | Caron . | |

Primary Examiner—Sandra L. O'Shea
Assistant Examiner—Warren S. Edmonds
Attorney, Agent, or Firm—Woodard, Emhardt, Naughton Moriarty & McNett

[57] ABSTRACT

A wheel bearing speed sensor includes an annular rotor mounted to a vehicle axle spindle, having a plurality of teeth extending radially outwardly, which is received within a stationary stator assembly. The stator assembly includes an annular stator having a corresponding plurality of teeth extending from one end and positioned proximate to the rotor teeth. A bobbin member is slidably received within the stator just above the radially aligned rotor and stator teeth and is restricted from movement toward the teeth. A flexible magnetic strip is magnetically adhered to the inner surface of the stator adjacent the bobbin member, wherein the magnetic strip restricts movement of the bobbin member axially away from the radially aligned teeth. A variable reluctance magnetic flux path is established simultaneously between all of the rotor and stator teeth as the spindle rotates, thereby inducing a corresponding variable voltage in the bobbin windings.

32 Claims, 4 Drawing Sheets

WHEEL BEARING SPEED SENSOR

FIELD OF THE INVENTION

The present invention relates generally to automotive wheel bearing speed sensors and more specifically to such sensors using variable reluctance to measure wheel bearing rotational speeds for determining, for example, wheel lock or slippage.

BACKGROUND OF THE INVENTION

Bearing type wheel speed sensors are commonly used in brake control systems, antilock brake systems (ABS), traction control systems, differential lock-up systems and the like to provide a control signal representative of wheel rotational speed to a controller such as a microprocessor based electronic control unit. Typically, such sensors are electromagnetic in nature and rely on a variable reluctance magnetic flux path to produce the wheel speed signal.

Annular rotational speed sensor assemblies having multi-toothed stators which surround a similarly multi-toothed rotor, or vise versa, are known in the art. Annular multi-toothed assemblies are preferred for sensing low wheel rotational speeds since they tend to provide high sensitivity as well as high signal to noise ratios. Examples of such wheel speed sensors may be seen by reference to U.S. Pat. Nos. 5,111,098, 5,227,719, 5,281,911, 5,291,130 and 5,336,995.

Some problems encountered with prior art wheel bearing speed sensors include unwanted magnetic flux loss to the housing and bearing assemblies, inefficient flux transfer and low sensitivities under certain conditions. Prior art attempts at overcoming some of these problems have resulted in burdensomely complex fabrication and assembly techniques used to achieve desired performance characteristics. What is therefore needed is a simple, easily manufactured and low cost wheel bearing speed sensor which will, at the same time, provide desirable performance characteristics. Such a sensor should provide an efficient flux path, have minimal flux loss and have high sensitivity. In addition, the sensor should be easy and inexpensive to manufacture by maintaining structural simplicity and incorporating inexpensive materials.

SUMMARY OF THE INVENTION

The wheel bearing speed sensor of the present invention overcomes many of the foregoing problems associated with similar prior art sensors. Minimal and inexpensive components are used to provide a highly efficient, low flux loss and highly sensitive wheel bearing speed sensor.

According to one aspect of the present invention, a wheel bearing speed sensor comprises a vehicle axle spindle rotatable about an axis on a plurality of bearings within a wheel bearing housing, an annular rotor mounted to the spindle for rotation therewith, wherein one end of the rotor defines a plurality of teeth, and a stator assembly fixed to the wheel bearing housing. The stator assembly includes an annular stator having a plurality of teeth extending from one end thereof and an opposite end. An annular bobbin member has a plurality of conductor windings around the periphery thereof and is slidably received within the stator between the stator teeth and the opposite end of the stator. The bobbin member also includes means cooperative with the stator to restrict axial movement of the bobbin member toward the stator teeth. Finally, a magnet is received radially within the stator between the bobbin member and the opposite end of the stator. The magnet defines a magnetic pole along an outer surface thereof which is magnetically secured to an inner periphery of the stator adjacent the bobbin member to thereby restrict axial movement of the bobbin member toward the opposite end of the stator. The magnet further defines an opposite pole along an inner surface thereof opposite the outer surface. The rotor is axially received within the stator assembly such that the rotor teeth extend radially toward the stator teeth. An opposite end of the rotor is positioned adjacent the inner magnet surface. The rotation of the rotor relative to the stator assembly causes the rotor teeth to alternately align and misalign with said stator teeth so that an alternating magnetic flux passing around the bobbin member induces a corresponding alternating voltage in the conductor windings.

According to another aspect of the present invention, a wheel bearing speed sensor comprises a bearing assembly including a vehicle axle spindle rotatable about an axis on a plurality of bearings within a wheel bearing housing, an annular rotor mounted to the spindle for rotation therewith, wherein one end of the rotor defines a plurality of teeth, and a stator assembly fixed to the wheel bearing housing. The stator assembly includes an annular stator having an inner circumference, a plurality of teeth extending from one end thereof and an opposite end, an annular bobbin member having a plurality of conductor windings around the periphery thereof, wherein the bobbin member is slidably received within the inner circumference of the stator between the stator teeth and the opposite end of the stator, and a flexible magnetic strip received within the stator between the bobbin member and the opposite end of the stator. The magnetic strip defines a magnetic pole along a first face, wherein the first face is magnetically secured to a substantially equal portion of the inner circumference of the stator adjacent the bobbin member. The magnet has a second face opposite the first face which defines an opposite magnetic pole. The magnetic strip is positioned remote from the bearing assembly to thereby minimize magnetic flux loss thereto. The rotor is axially received within the stator assembly such that the rotor teeth extend radially toward the stator teeth, and an opposite end of the rotor is positioned adjacent the second face of the magnetic strip. Rotation of the rotor relative to the stator assembly causes the rotor teeth to alternately align and misalign with the stator teeth so that an alternating magnetic flux passing around the bobbin member induces a corresponding alternating voltage in the conductor winding.

According to yet another aspect of the present invention, a wheel bearing speed sensor comprises a bearing assembly including a stationary hub having an inner surface defining an outer bearing race, a vehicle axle spindle having an axis of rotation and an outer surface defining an inner bearing race located radially within the outer bearing race, and a plurality of rolling bearing members disposed between the inner race and the outer race for permitting relative rotation between the races. An annular rotor is mounted to the spindle at one end of the inner race for rotation therewith, wherein the rotor has an outer surface defining a plurality of teeth around the periphery thereof at one end of the rotor. A stator assembly fixed to the outer bearing race includes an annular stator having an inner circumference, a plurality of teeth extending from one end thereof and an opposite end. An annular bobbin member having a plurality of conductor windings around the periphery thereof is slidably received within the stator between the stator teeth and the opposite end of the stator. The bobbin member also includes means cooperative with the stator to restrict axial movement of the bobbin member toward the stator teeth. Finally, a flexible magnetic strip is received within the stator between the bobbin member and the opposite end of the stator. The magnetic strip defines a magnetic pole along a first face, wherein the first face is magnetically secured to a substantial portion of the inner circumference of the stator adjacent the bobbin member to thereby restrict axial movement of the bobbin member toward the opposite end of the stator. The magnet has a second face opposite the first face which defines an opposite magnetic pole. The magnetic strip is positioned remote from the bearing assembly to thereby minimize magnetic flux loss thereto. The rotor is axially received within the stator assembly such that the rotor teeth extend radially toward the stator teeth. An opposite end of the rotor is positioned adjacent the second face of the magnetic strip. Rotation of the rotor relative to the stator assembly causes the rotor teeth to alternately align and misalign with the stator teeth so that an alternating magnetic flux passing around the bobbin member induces a corresponding alternating voltage in the conductor windings.

One object of the present invention is to provide a wheel bearing speed sensor wherein the rotor and stator have an equal number of radially and axially aligned teeth, and wherein the sensor takes advantage of the potential flux change in all teeth simultaneously to provide a high sensitivity sensor signal.

Another object of the present invention is to provide an efficient magnetic flux path in a wheel bearing speed sensor by incorporating a flexible annular magnet such that one pole thereof has its entire surface in contact with an interior circumference of the stator.

A further object of the present invention is to provide a simplified wheel bearing speed sensor construction wherein the bobbin coil is received within an annular stator having teeth peripherally extending therefrom, and wherein the bobbin coil is trapped between the stator teeth and a flexible magnetic strip under the magnetic attraction between one pole of the magnet and the interior of the stator.

Yet another object of the present invention is to provide a wheel bearing speed sensor having low magnetic flux loss wherein a rotor and stator assembly are housed within a non-magnetic cup, and wherein the stator assembly includes a magnet positioned remote from the wheel bearing assembly.

These and other objects of the present invention will become more apparent from the following description of the preferred embodiment.

DESCRIPTION OF THE PREFERRED EMBODIMENT

For the purposes of promoting an understanding of the principles of the invention, reference will now be made to the embodiment illustrated ill the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
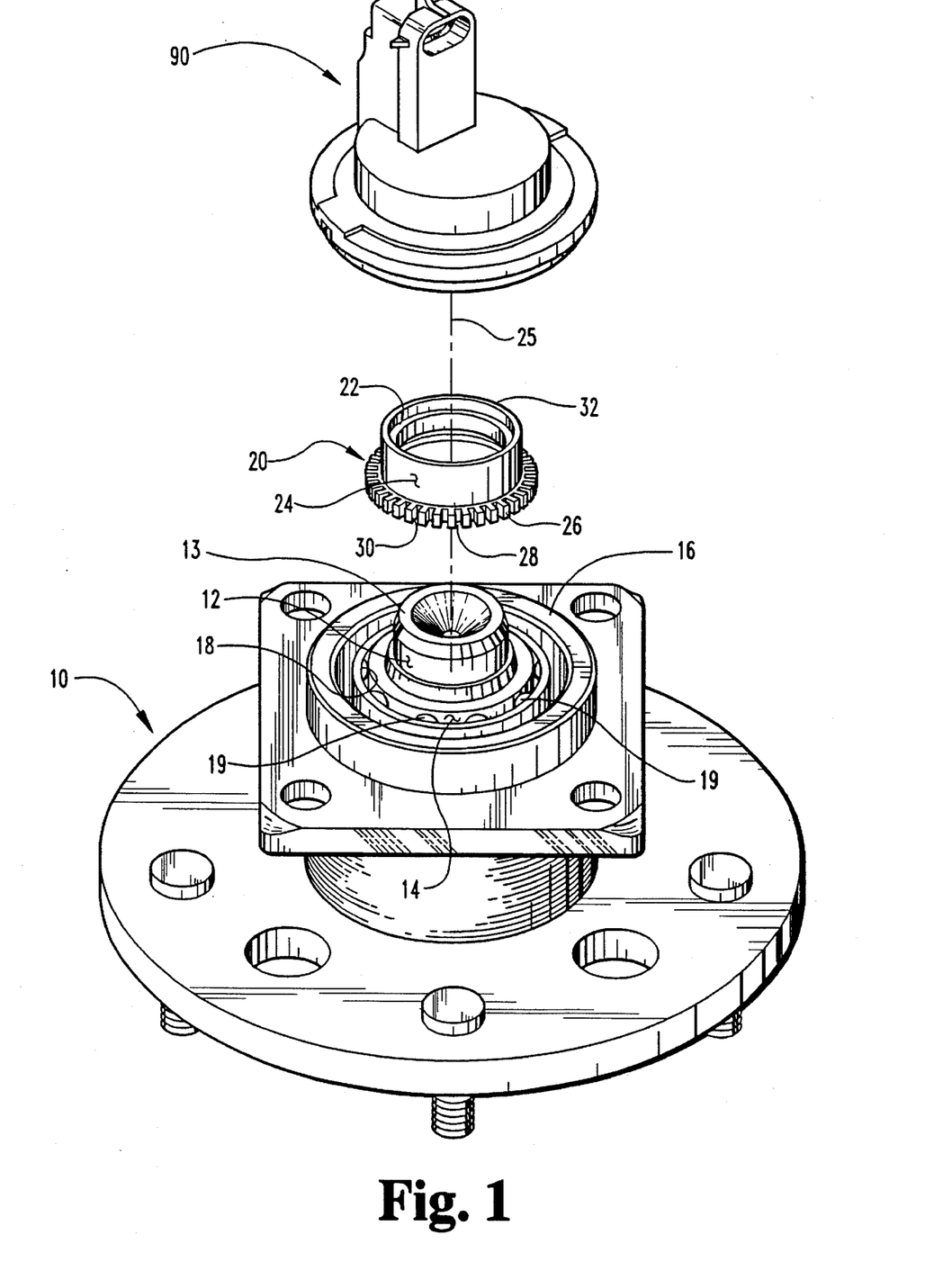
FIG. 1 is an exploded perspective view of a wheel bearing assembly, rotor and wheel bearing sensor housing in accordance with the present invention.
Figure 4:
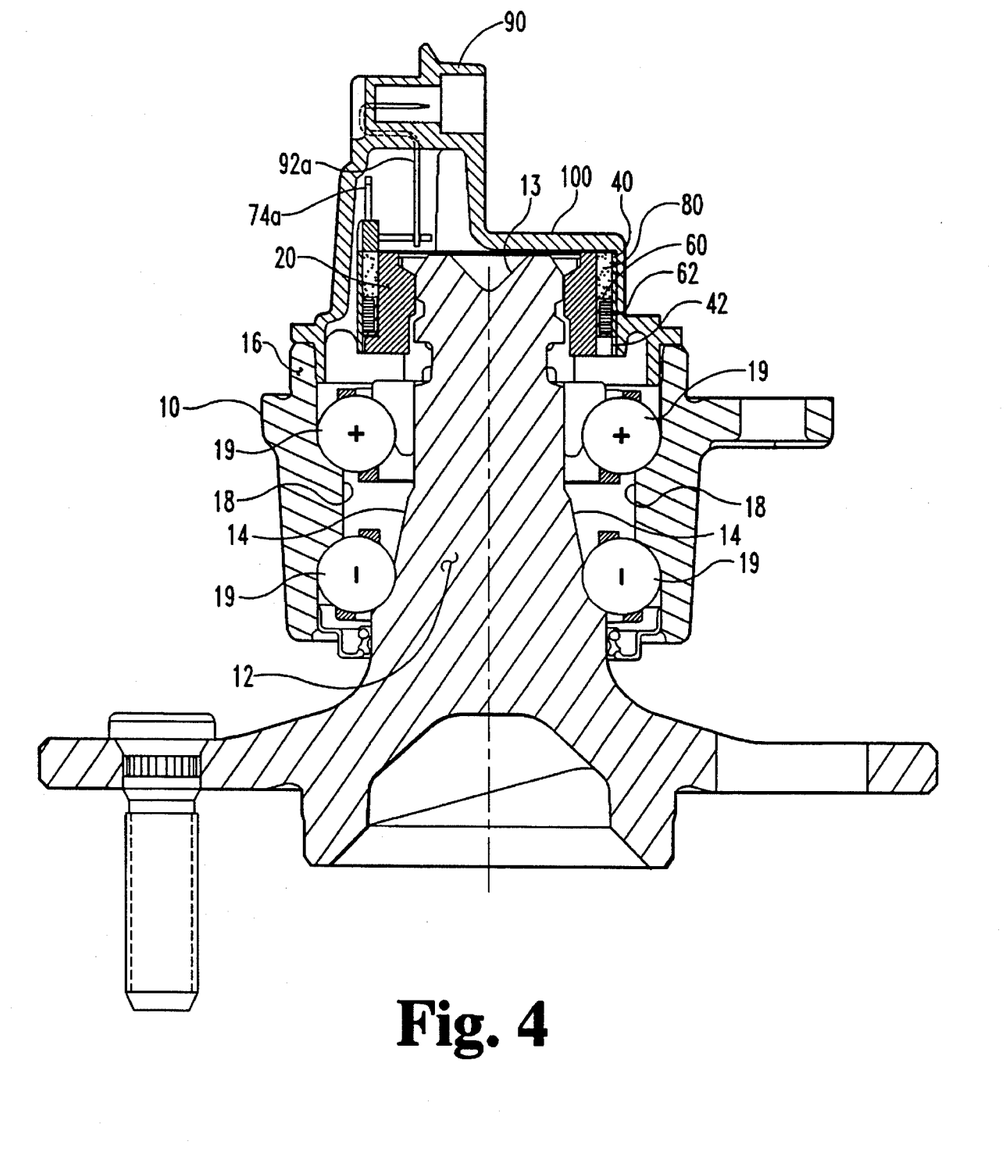
FIG. 4 is a cross-sectional illustration of the wheel bearing speed sensor of the present invention coupled to a wheel bearing assembly.

Referring now to FIGS. 1 and 4, a wheel bearing assembly 10 is shown which, in accordance with the present invention, is normally carried on a non-driven axle of a motor vehicle (not shown). It is to be understood, however, that the concepts of the present invention are equally applicable to bearing assemblies of driven axles.

Wheel bearing assembly 10 includes a vehicle axis spindle 12 having an outer surface defining an inner race 14. Spindle 12 is received within a hub 16 having an inner surface defining an outer race 18. Inner race 14 and outer race 18 form a space therebetween for engaging a plurality of rolling bearing members; typically ball bearings 19. In operation, spindle 12 and inner race 14 are rotatable about an axis 25 while hub 16 and outer race 18 are stationary relative to the spindle 12. The foregoing wheel bearing assembly 10 is a conventional wheel bearing assembly and operation thereof is commonly known in the art.

An important feature of wheel bearing assembly 10, in accordance with the present invention, is the addition of an annular rotor 20 mounted thereto. Rotor 20 should be constructed of a material capable of efficiently conducting magnetic flux and should further be constructed of a material that permits rotor 20 to be easily manufactured. Preferably, rotor 20 is constructed of steel, although the present invention contemplates providing rotor 20 from other magnetically attractible materials as well.

Rotor 20 has an interior surface 22 which is adapted to mount to the outer surface of the spindle 12 adjacent to the spindle end 13. In its mounted position, rotor 20 rotates with spindle 12 about the rotational axis 25. Rotor 20 further has all outer surface 24 which defines a plurality of equally spaced teeth 26 and slots 28 extending radially therefrom around the periphery of one end 30 of rotor 20. Rotor 20 further extends away from wheel bearing assembly 10 to an opposite rotor end 32. As will be more fully described hereinafter, rotor 20 and a portion of spindle 12 are received within wheel bearing speed sensor housing 90.

Figures 2, 2A:
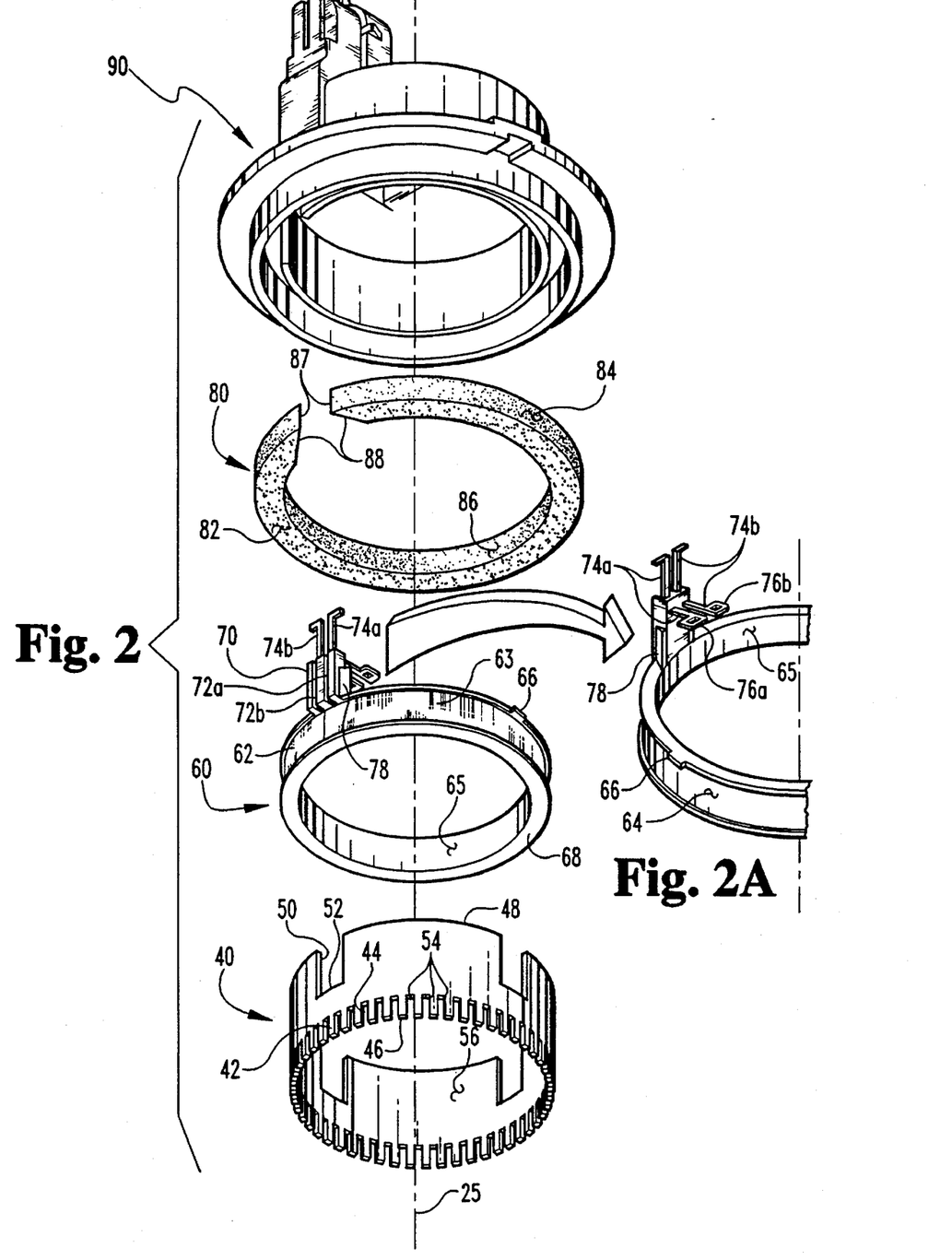
FIG. 2 is an exploded perspective view of a stator assembly for use with the wheel bearing speed sensor of the present invention.
Figure 3:
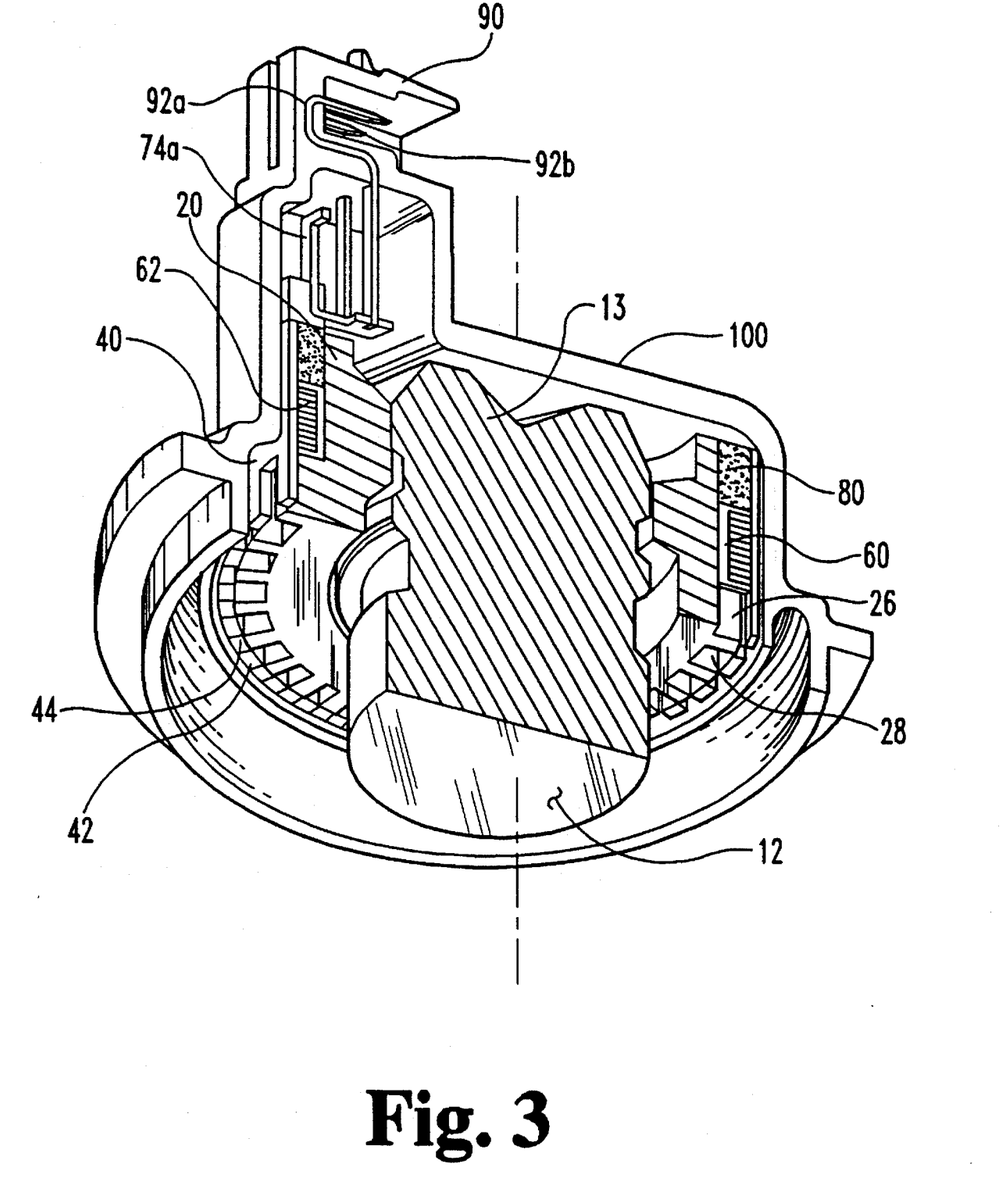
FIG. 3 is a cross-sectional perspective view of the wheel bearing speed sensor of the present invention.

Referring now to FIGS. 2 and 3, stator assembly 35 is shown in accordance with the present invention. As its central component, stator assembly 35 includes an annular stator 40. Stator 40 should be constructed of a material capable of efficiently conducting magnetic flux and should further be constructed of a material that permits stator 40 to be easily manufactured. Like rotor 20, stator 40 is preferably constructed of steel, although the present invention contemplates providing stator 40 from other magnetically attractible materials as well.

Stator 40 defines a plurality of teeth 42, equally spaced by a plurality of slots 44, extending axially from the entire periphery of stator end 46 in a direction parallel with the rotational axis 25. The opposite end 48 of stator 40 defines a number of recesses 50 therein which terminate at an edge 52. Preferably, stator 40 includes four such recesses, the purpose of which will become readily apparent hereinafter. However, the present invention contemplates providing as few as two recesses 50 and up to an unlimited number of recesses 50. Stator 40 further defines an interior surface 56 between the edges 54 of slots 44 and the opposite end 48.

Stator assembly 35 further includes an annular bobbin member 60 having a plurality of conductor windings 62 around its periphery and contained within channel 64. Preferably, conductor windings 62 are made of copper, although various electrically conducting materials may be used. Bobbin member 60 further includes a number of tabs 66 extending radially therefrom. In assembling stator assembly 35, bobbin member 60 is slidably received within stator 40 from the top 48 thereof. As bobbin member 60 is so received, tabs 66 extend into recesses 50 of stator 40 so that the conductor windings 62 are positioned in close proximity to the interior surface 56 of the stator 40. To prevent the conductor windings 62 from contacting the interior surface 56 of stator 40, insulating tape 63 is wrapped around channel 64 after the conductor windings 62 positioned therein. As bobbin member 60 slides toward the end 46 of the stator 40, the tabs 66 come into contact with edges 52 of slots 50 so that further movement of bobbin member 60 is thereby restricted. The purpose of slots 50 is thus apparent and bobbin member 66 therefore requires a number of tabs 66 equal to, and correspondingly positioned adjacent, recesses 50. In its assembled position within stator 40, the bottom surface 68 of bobbin member 60 is positioned radially adjacent slot edges 54.

It is to be understood that the importance of tabs 66 and corresponding recesses 50 lies in their ability to restrict further axial movement of bobbin member 60 toward the end 46 of stator 40 when bobbin member 60 is in its assembled position. In this regard, the present invention contemplates alternative methods and structure for preventing such axial movement. For example, the interior 56 of stator 40 may include a rimmed surface and bobbin member 60 may have a corresponding continuous lip or flange which is received within the rimmed surface to thereby restrict further axial movement. Thus, the structure shown for so restricting axial movement should therefore not be considered to be limiting, but should be considered to represent one of many possible mechanism contemplated by the present invention to restrict further axial movement of bobbin member 66 toward teeth 42 and slots 44.

Bobbin member 66 further includes a projection 70 extending axially away from bobbin member 60 in a direction opposite teeth 42 and slots 44 of stator 40. Projection 70 defines a pair of slots 72a and 72b for receiving corresponding bifurcated electrical terminals 74a and 74b. In assembling stator assembly 35, the ends of conductor winding 62 (not shown) are attached by known methods, such as by soldering, to corresponding terminals 74a and 74b. The portions of terminals 74a and 74b extending toward rotation axis 25 include bores 76a and 76b respectively therethrough, the purpose of which will be more fully described hereinafter.

Preferably, projection 70 is sized to be received within one of the recesses 50 in stator 40, thereby requiring one less tab 66. Projection 70 further defines a pair of flanges 78 (one shown) extending from either side of projection 70 which generally follow the radial contour of bobbin member 60 (and thus the interior 56 of stator 40).

Finally stator assembly includes a magnet 80 which is adapted to be received within stator 40 adjacent bobbin member 60. Magnet 80 has a bottom surface 82 which in the stator assembly 35, is in contact with the upper rim 69 of bobbin member 60. Magnet 80 is a bipolar magnet and has a first surface 84 defining one magnetic pole, and a second surface 86 defining an opposite magnetic pole. In assembling stator assembly 35, a substantial portion of surface 84 is intended to be in magnetic contact with the inner surface 56 of stator 40 such that surfaces 56 and 84 are magnetically secured. This arrangement provides an important aspect of the present invention in that magnet 80, magnetically secured to surface 56 of stator 40, acts to restrict bobbin member 60 from axial movement in a direction opposite teeth 42 and slots 44. From the foregoing, an advantageous feature of the present invention is readily apparent in that stator assembly 35 does not require the use of fixation elements to secure the bobbin member 60 and magnet 80 in their operative positions within stator 40.

Since magnetic surface 84 is intended to be in substantial magnetic contact with inner surface 56 of stator 40 in assembly 35, magnet 80 is preferably a flexible strip of magnetic material. In one embodiment, a flexible strip of rubber is impregnated with magnetic ferrite particles to provide magnet 80. However, the present invention contemplates that rigid or semi-rigid materials may also be used to provide magnet 80 as long as a substantial portion of the magnetic surface 84 maintains magnetic contact with inner surface 56 of stator 40. As will be more fully discussed hereinafter, such magnetic contact contributes to an increased magnetic flux flow efficiency.

In providing magnet 80 as a flexible strip of magnetic material, it is preferable to configure the ends 87 thereof to correspondingly mate with flanges 78 of bobbin member projection 70. Securing the ends 87 of magnet 80 between corresponding flanges 78 and interior surface 56 of stator 40 keeps the ends 87 from being drawn toward the surface 24 of the rotor 20, under magnetic attraction established between magnetic surface 86 and rotor surface 24, when the rotor is received within stator assembly 35 as most clearly shown in FIG. 3. In a preferred embodiment, flanges 78 are beveled away from the interior surface 56 of stator 40 and end faces 88 of magnet 80 are correspondingly angled so that they may be secured between beveled flanges 78 and surface 56 within stator assembly 35.

Finally, a non-magnetic housing cup 90 is provided, as previously discussed, for fixedly receiving stator assembly 35 and the rotor 20—spindle 12 combination. As most clearly shown in FIG. 4, cup 90 is fixed to stationary hub 16. A pair of connector terminals 92a and 92b (FIG. 3) are provided in cup 90 and are received within corresponding bores 76a and 76b of electrical terminals 74a and 74b respectively of bobbin member 60. Connector terminals 92a and 92b are electrically attached to terminals 74a and 74b respectively using known electrical attachment techniques such as, for example, soldering. Terminals 92a and 92b are further provided external to cup 90 for connection to, for example, an electronic controller or other signal processing device (not shown).

Referring now to FIGS. 3 and 4, the assembled wheel bearing speed sensor 100, incorporating sensor assembly 35, rotor 20 and bearing assembly 10, is shown in accordance with a preferred embodiment of the present invention. Rotor 20, mounted to the outer surface of the spindle 12 adjacent the spindle end 13, is received within sensor assembly 35 which is, in turn, pressed into non-magnetic housing cup 90. As best seen in FIG. 3, rotor teeth 26 and slots 28 are sized identically to a corresponding number of stator teeth 42 and slots 44. In the final assembly of wheel bearing speed sensor 100, as shown in FIG. 3 with wheel bearing assembly 10 removed for clarity, rotor 20, stator 40, bobbin member 60 and magnet 80 are preferably configured so that gaps therebetween are minimized which results in an increased magnetic flux flow efficiency. In particular, magnet 80 is magnetically secured to inner surface 56 of stator 40 as previously described. Moreover, bobbin member 60 is in contact with magnet 80 and is further positioned just above the stator (and rotor) teeth 42, also as previously described. In addition, identically sized rotor teeth 26 (and corresponding slots 28) and stator teeth 42 (and corresponding slots 44) are radially positioned with respect to each other to define a minimum air gap distance therebetween. Similarly, the surface 24 of rotor is radially recessed from rotor teeth 26 so that the same minimum air gap distance exists between the inner surface 65 of bobbin member 60 and rotor surface 24, and between magnet surface 86 and rotor surface 24. These tolerances result in increased magnetic flux flow efficiency which translates to lower magnetic flux loss and increased sensor sensitivity.

In operation of the wheel bearing speed sensor 100, the vehicle axle spindle 12, and rotor 20 mounted thereto, rotate about axis 25. The hub 16, stator assembly 35 and stator housing cup 90 remain stationary relative to the rotating spindle 12 and rotor 20. When the teeth 26 of the rotor 20 are aligned with the identical number of stator teeth 42, a minimum reluctance magnetic flux path is established. In particular, the magnetic flux travels, in this instance, from the exterior surface 84 of magnet 80 to the interior surface 56 of stator 40, from the interior surface 56 of stator 40 to each of the stator teeth 42, from each of the stator teeth 42 across the minimum distance air gap to each of the correspondingly aligned rotor teeth 26, from each of the rotor teeth 26 to the outer surface 24 of rotor 20, and finally from the outer surface 24 of rotor 24 across the minimal distance air gap to the interior magnet surface 86 to complete the magnetic circuit.

As the spindle 12 and rotor 20 continue to rotate, the rotor teeth 26 and stator teeth 42 become misaligned, thereby increasing the air gap distance therebetween which results in an increased reluctance flux path. When the rotor teeth 26 are aligned with the stator slots 44, or alternatively when the rotor slots 28 are aligned with the stator teeth 42, the radial air gap between the stator 40 and rotor 20 is at a maximum and is defined as the distance between the rotor or stator teeth and corresponding stator or rotor slot. In this position, a maximum magnetic flux reluctance path is established. As the rotor 20 rotates, maximum and minimum reluctance flux paths are thereby alternately established at a rate corresponding to the rotational speed of the rotor 20. As is commonly known in the art, such an alternating reluctance flux path around the bobbin member 60 induces a corresponding alternating voltage in the conductor windings 62. The voltage across the conductor windings 62 may be detected at terminals 92a and 92b of the wheel bearing speed sensor 100.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A wheel bearing speed sensor comprising:

a vehicle axle spindle rotatable about an axis on a plurality of bearings within a wheel bearing housing;

all annular rotor mounted to said spindle for rotation therewith, one end of said rotor defining a plurality of teeth; and a stator assembly fixed to said wheel bearing housing, said stator assembly including:

an annular stator having a plurality of teeth extending from one end thereof and an opposite end;

an annular bobbin member having a plurality of conductor windings around the periphery thereof, said bobbin member being slidably received within said stator between said stator teeth and said opposite end, said bobbin member having means cooperative with said stator to restrict axial movement of said bobbin member toward said stator teeth; and a magnet received radially within said stator between said bobbin member and said opposite end, said magnet defining a magnetic pole along an outer surface thereof magnetically secured to an inner periphery of said stator adjacent said bobbin member to thereby restrict axial movement of said bobbin member toward said opposite end of said stator, said magnet defining an opposite pole along an inner surface thereof opposite said outer magnet surface;

wherein said rotor is axially received within said stator assembly such that said rotor teeth extend radially toward said stator teeth, and an opposite end of said rotor is positioned adjacent said inner magnet surface;

and wherein rotation of said rotor relative to said stator assembly causes said rotor teeth to alternately align and misalign with said stator teeth so that an alternating magnetic flux passing around said bobbin member induces a corresponding alternating voltage in said conductor windings.

2. The wheel bearing speed sensor of claim 1 wherein said plurality of rotor teeth extend radially from an outer circumference of said rotor, said circumference of rotor teeth defining a radial surface positioned proximate said bobbin member.

3. The wheel bearing speed sensor of claim 2 wherein said plurality of rotor teeth are uniformly sized;

and wherein said rotor teeth are spaced apart by a plurality of uniformly sized slots, said slots being sized substantially identical to said rotor teeth.

4. The wheel bearing speed sensor of claim 3 wherein said plurality of stator teeth are uniformly sized, said stator teeth being sized substantially identical to said rotor teeth;

and wherein said stator teeth are spaced apart by a plurality of uniformly sized slots, said slots being sized substantially identical to said stator teeth.

5. The wheel bearing speed sensor of claim 4 wherein said bobbin member further includes a first pair of terminals for electrically connecting ends of said conductor thereto.

6. The wheel bearing speed sensor of claim 5 further including a non-magnetic cup mounted to said wheel bearing housing and configured to receive said stator assembly therein, said cup being operable to minimize magnetic flux loss to said spindle, said bearing housing and said plurality of bearings.

7. The wheel bearing speed sensor of claim 6 wherein said non-magnetic cup includes a second pair of terminals extending into said cup and electrically connected to said first pair of terminals.

8. The wheel bearing speed sensor of claim 4 wherein the number of rotor teeth is equal to the number of stator teeth;

and wherein said rotor teeth and said stator teeth define a minimum distance therebetween when aligned.

9. The wheel speed sensor of claim 8 wherein said rotor teeth and said stator slots define a maximum distance therebetween when aligned.

10. The wheel bearing speed sensor of claim 9 wherein said outer circumference of said rotor adjacent said opposite end thereof and said inner magnet surface define said minimum distance therebetween.

11. The wheel bearing speed sensor of claim 10 wherein said rotor and said stator are constructed from a magnetically attractible material.

12. The wheel bearing speed sensor of claim 11 further including a magnetic flux path defined around said bobbin member, said magnetic flux path defined by flux travel from said outer surface of said magnet to said stator, from said stator teeth to said rotor teeth, and across said minimum distance from said outer rotor circumference to said inner magnet surface;

wherein the reluctance for said magnetic flux to travel from said stator to said rotor is minimum when said rotor teeth are aligned with said stator teeth, and the reluctance for said magnetic flux to travel from said stator to said rotor is maximum when said rotor teeth are aligned with said stator slots.

13. The wheel bearing speed sensor of claim 12 wherein said outer circumference of said rotor and said bobbin member define said minimum distance therebetween.

14. The wheel bearing speed sensor of claim 1 wherein said means cooperative with said stator to restrict axial movement of said bobbin member toward said stator teeth includes a number of recesses defined in said opposite end of said of said stator and a corresponding number of tabs extending radially from said bobbin member;

and wherein said tabs are received within said recesses to thereby restrict said axial movement of said bobbin member toward said stator teeth.

15. A wheel bearing speed sensor comprising:

a bearing assembly including a vehicle axle spindle rotatable about an axis on a plurality of bearings within a wheel bearing housing;

an annular rotor mounted to said spindle for rotation therewith, one end of said rotor defining a plurality of teeth; and a stator assembly fixed to said wheel bearing housing, said stator assembly including:

an annular stator having an inner circumference, a plurality of teeth extending from one end thereof and an opposite end;

an annular bobbin member having a plurality of conductor windings around the periphery thereof, said bobbin member being slidably received within said inner circumference of said stator between said stator teeth and said opposite end; and a flexible magnetic strip received within said stator between said bobbin member and said opposite end, said magnetic strip defining a magnetic pole along a first face, said first face being magnetically secured to a substantially equal portion of said inner circumference of said stator adjacent said bobbin member, said magnet having a second face opposite said first face defining an opposite magnetic pole, said magnetic strip being positioned remote from said bearing assembly to thereby minimize magnetic flux loss thereto;

wherein said rotor is axially received within said stator assembly such that said rotor teeth extend radially toward said stator teeth, and an opposite end of said rotor is positioned adjacent said second face of said magnetic strip;

and wherein rotation of said rotor relative to said stator assembly causes said rotor teeth to alternately align and misalign with said stator teeth so that an alternating magnetic flux passing around said bobbin member induces a corresponding alternating voltage in said conductor windings.

16. The wheel bearing sensor of claim 15 wherein said rotor and said stator are constructed from a magnetically attractible material.

17. The wheel bearing speed sensor of claim 16 wherein said bobbin member includes a projection extending therefrom toward said opposite end of said stator, said projection defining a pair of flanges extending from either side thereof and generally following the contour of said inner circumference of said stator.

18. The wheel bearing speed sensor of claim 17 wherein said magnetic strip has a pair of ends configured matingly opposite said bobbin member flanges, each of said magnetic strip ends being trapped between said inner circumference of said stator and a corresponding one of said flanges to thereby prevent said magnetic strip ends from being pulled toward said rotor by magnetic attraction.

19. The wheel bearing speed sensor of claim 18 wherein each of said flanges is beveled away from said inner circumference of said stator.

20. The wheel bearing speed sensor of claim ].8 wherein said plurality of rotor teeth extend radially from an outer circumference of said rotor, said circumference of rotor teeth defining a radial surface positioned proximate said bobbin member.

21. The wheel bearing speed sensor of claim 20 wherein said plurality of rotor teeth are uniformly sized;

and wherein said rotor teeth are spaced apart by a plurality of uniformly sized slots, said slots being sized substantially identical to said rotor teeth.

22. The wheel bearing speed sensor of claim 21 wherein said plurality of stator teeth are uniformly sized, said stator teeth being sized substantially identical to said rotor teeth;

and wherein said stator teeth are spaced apart by a plurality of uniformly sized slots, said slots being sized substantially identical to said stator teeth.

23. The wheel bearing speed sensor of claim 22 further including a non-magnetic cup mounted to said wheel bearing housing and configured to receive said stator assembly therein, said cup being operable to minimize magnetic flux loss to said bearing assembly.

24. The wheel bearing speed sensor of claim 22 wherein the number of rotor teeth is equal to the number of stator teeth;

and wherein said rotor teeth and said stator teeth define a minimum distance therebetween when aligned.

25. The wheel speed sensor of claim 24 wherein said rotor teeth and said stator slots define a maximum distance therebetween when aligned.

26. The wheel bearing speed sensor of claim 25 wherein said outer circumference of said rotor adjacent said opposite end thereof and said inner magnet surface define said minimum distance therebetween.

27. The wheel bearing speed sensor of claim 26 further including a magnetic flux path defined around said bobbin member, said magnetic flux path defined by flux travel from said first face of said magnetic strip to said stator, from said stator teeth to said rotor teeth, and across said minimum distance from said outer rotor circumference to said second face of said magnetic strip;

wherein the reluctance for said magnetic flux to travel from said stator to said rotor is minimum when said rotor teeth are aligned with said stator teeth, and the reluctance for said magnetic flux to travel from said stator to said rotor is maximum when said rotor teeth are aligned with said stator slots.

28. The wheel bearing speed sensor of claim 27 wherein said outer circumference of said rotor and said bobbin member define said minimum distance therebetween.

29. The wheel bearing speed sensor of claim 15 wherein said bobbin member further includes means cooperative with said stator to restrict axial movement of said bobbin member toward said stator teeth.

30. The wheel bearing speed sensor of claim 29 wherein said means cooperative with said stator to restrict axial movement of said bobbin member toward said stator teeth includes a number of recesses defined in said opposite end of said of said stator and a corresponding number of tabs extending radially from said bobbin member;

and wherein said tabs are received within said recesses to thereby restrict said axial movement of said bobbin member toward said stator teeth.

31. A wheel bearing speed sensor comprising:

a bearing assembly including:

a stationary hub having an inner surface defining an outer bearing race;

a vehicle axle spindle having an axis of rotation and an outer surface defining an inner bearing race located radially within said outer bearing race; and a plurality of rolling bearing members disposed between said inner race and said outer race for permitting relative rotation between said races;

an annular rotor mounted to said spindle at one end of said inner race for rotation therewith, said rotor having an outer surface defining a plurality of teeth around the periphery thereof at one end of said rotor; and a stator assembly fixed to said outer bearing race, said stator assembly including:

an annular stator having an inner circumference, a plurality of teeth extending from one end thereof and an opposite end;

an annular bobbin member having a plurality of conductor windings around the periphery thereof, said bobbin member being slidably received within said stator between said teeth and said opposite end, said bobbin member having means cooperative with said stator to restrict axial movement of said bobbin member toward said stator teeth; and a flexible magnetic strip received within said stator between said bobbin member and said opposite end, said magnetic strip defining a magnetic pole along a first face, said first face being magnetically secured to a substantial portion of said inner circumference of said stator adjacent said bobbin member to thereby restrict axial movement of said bobbin member toward said opposite end of said stator, said magnet having a second face opposite said first face defining an opposite magnetic pole, said magnetic strip being positioned remote from said bearing assembly to thereby minimize magnetic flux loss thereto;

wherein said rotor is axially received within said stator assembly such that said rotor teeth extend radially toward said stator teeth, and an opposite end of said rotor is positioned adjacent said second face of said magnetic strip;

and wherein rotation of said rotor relative to said stator assembly causes said rotor teeth to alternately align and misalign with said stator teeth so that an alternating magnetic flux passing around said bobbin member induces a corresponding alternating voltage in said conductor windings.

32. The wheel bearing speed sensor of claim 31 wherein said means cooperative with said stator to restrict axial movement of said bobbin member toward said stator teeth includes a number of recesses defined in said opposite end of said of said stator and a corresponding number of tabs extending radially from said bobbin member;

and wherein said tabs are received within said recesses to thereby restrict said axial movement of said bobbin member toward said stator teeth.

* * * * *

UNITED STATES PATENT AND TRADEMARK OFFICE
CERTIFICATE OF CORRECTION

PATENT NO. : 5,491,407
DATED : February 13, 1996
INVENTOR(S) : William R. Maxson et al.

It is certified that error appears in the above-indentified patent and that said Letters Patent is hereby corrected as shown below:

In column 7, line 61, please delete "all" and replace with -- an --.

In column 10, line 19, please delete "]." and replace with -- 1 --.

Signed and Sealed this

Eleventh Day of June, 1996

Attest:

BRUCE LEHMAN

Attesting Officer

Commissioner of Patents and Trademarks